United States Patent [19]
MacDonald et al.

[11] Patent Number: 5,291,031
[45] Date of Patent: Mar. 1, 1994

[54] OPTICAL PHASE DIFFERENCE RANGE DETERMINATION IN LIQUID LEVEL SENSOR

[75] Inventors: Robert I. MacDonald; George D. Fraser, both of Alberta, Canada

[73] Assignee: Telecommunications Research Laboratories, Edmonton, Canada

[21] Appl. No.: 863,739

[22] Filed: Apr. 6, 1992

[51] Int. Cl.⁵ .......................................... G01N 15/06
[52] U.S. Cl. ...................................... 250/577; 356/5
[58] Field of Search ............... 250/576, 577, 564, 565; 73/293; 356/5

[56] References Cited

U.S. PATENT DOCUMENTS

| | | | |
|---|---|---|---|
| 4,689,489 | 8/1987 | Cole | 356/5 |
| 4,692,023 | 9/1987 | Ohtomo et al. | 356/5 |
| 4,938,590 | 7/1990 | Ishida | 356/5 |

Primary Examiner—David C. Nelms
Assistant Examiner—K. Shami
Attorney, Agent, or Firm—Sim & McBurney

[57] ABSTRACT

An apparatus and electronic circuit for the measurement of fluid levels in containers. The circuit and apparatus constitute an instrument which measures fluid levels by optical means. Only light signals are used near the fluid itself. The instrument thus provides an intrinsically safe method of measuring fluid levels in the presence of explosive or flammable fluids, vapours or gasses, or in containers which must be electrically isolated.

3 Claims, 8 Drawing Sheets

OPTICAL PHASE DIFFERENCE RANGE DETERMINATION IN LIQUID LEVEL SENSOR

FIELD OF THE INVENTION

This invention relates in general to measuring devices, and in particular to an optical fluid level sensing system.

BACKGROUND OF THE INVENTION

A variety of mechanisms are currently available to measure the levels of fluids in containers. There are also a number of measurement techniques available for use with completely sealed and pressurized containers. According to one prior art technique, mechanical apparatus is provided by which a float, typically disposed in a transparent tube parallel to the central axis to the tank, permits direct observation of the fluid level in the tank. A disadvantage of this technique is that it requires an operator to actually observe the tank level. This can lead to incorrect level measurement due to human error.

An alternative approach utilizes a float or similar device which is directly connected to an electrical/mechanical apparatus for generating an electrical signal which represents the fluid level in the tank. This technique, however, is difficult to use or may be prohibited in the presence of explosives or flammable fluids, vapours or gases, or in tanks or containers which must be electrically isolated.

Furthermore, such prior art techniques usually require mechanical or electrical sencing devices in proximity with the fluid, resulting in service and maintenance burdens for repairing such direct contact apparatus. In certain cases, it may be necessary to shut down or delay a plant's operation in order to repair or maintain such sensing apparatus.

In the art of surveying, it is known to use the detection of phase differences between emitted and reflected light signals to measure short distances (up to approximately 10 kilometers). However, it is believed that these broad principles have not hitherto been applied to the problem of measuring fluid levels in containers.

SUMMARY OF THE INVENTION

According to the present invention, a circuit and apparatus is provided for effecting optical detection of fluid levels. Since only light signals are used near the fluid itself, the system of the present invention is completely unobtrusive and does not interfere with fluid flow. Also, since no mechanical or electrical sencing is required, significant cost reductions may be realized over prior art techniques requiring such systems.

Furthermore, since no electrical or magnetic apparatus are involved in effecting the fluid level measurement according to the system of the present invention, the system provides an inherently safe measurement technique. Specifically, according to the present invention, no electrical currents are induced or generated nor is there any risk of spark other electrical contact with potentially explosive or flammable fluids, vapours or gases.

The system of the present invention is particularly useful when measuring fluid level of a liquid where the electrical state of the liquid being measured is required to be maintained since the measurement system is electrically isolated from the container an fluid.

According to an aspect of the present invention, there is provided a system for measuring fluid level of a liquid surface comprising, a) means for generating a first optical signal; b) means for directing said first optical signal toward said liquid surface, said means for directing being disposed at a distance from said liquid surface to be detected; c) reflector means disposed at a distance from said means for directing which is linearly related to said distance from said liquid surface to be determined, for reflecting said first optical signal so as to form a reflected signal; d) means for receiving and comparing said reflected signal said first optical signal for detecting phase shift therebetween, wherein said phase shift is directly proportional to said distance from said liquid surface to be detected.

According to another aspect of the invention, there is provided a system for measuring fluid level of a liquid surface in a container within a predetermined range of levels comprising, a) a transmitter for alternately generating a first optical signal and a second optical signal; b) a fitting connected to said container; c) a first optical guide connected to said transmitter and said fitting for receiving said first optical signal and transmitting said first optical signal to said fitting; d) a second optical guide connected to said transmitter and said fitting for receiving said second optical signal and transmitting said second optical signal to said fitting; e) means within said fitting for directing said first optical signal toward said liquid surface, said means for directing being disposed at a distance from said liquid surface to be detected; f) a reflector disposed in said container at a distance from said means for directing which is linearly related to said distance from said liquid surface to be determined, for reflecting said first optical signal so as to form a reflected ranging signal; g) a receiver associated with said transmitter; h) a third optical guide connected to said fitting and said receiver; i) means within said fitting for directing said reflected ranging signal into said third optical guide; j) a fourth optical guide connected to said fitting and said receiver; k) means within said fitting for directing said second optical signal into said fourth optical guide; and l) signal processing means connected to said receiver for comparing said second optical signal and said reflected ranging signal and in response generating a signal representing phase shift therebetween, wherein said phase shift is directly proportional to said distance from said liquid surface to be detected.

DETAILED DESCRIPTION OF THE PREFERRED EMBODIMENT

Figure 1:
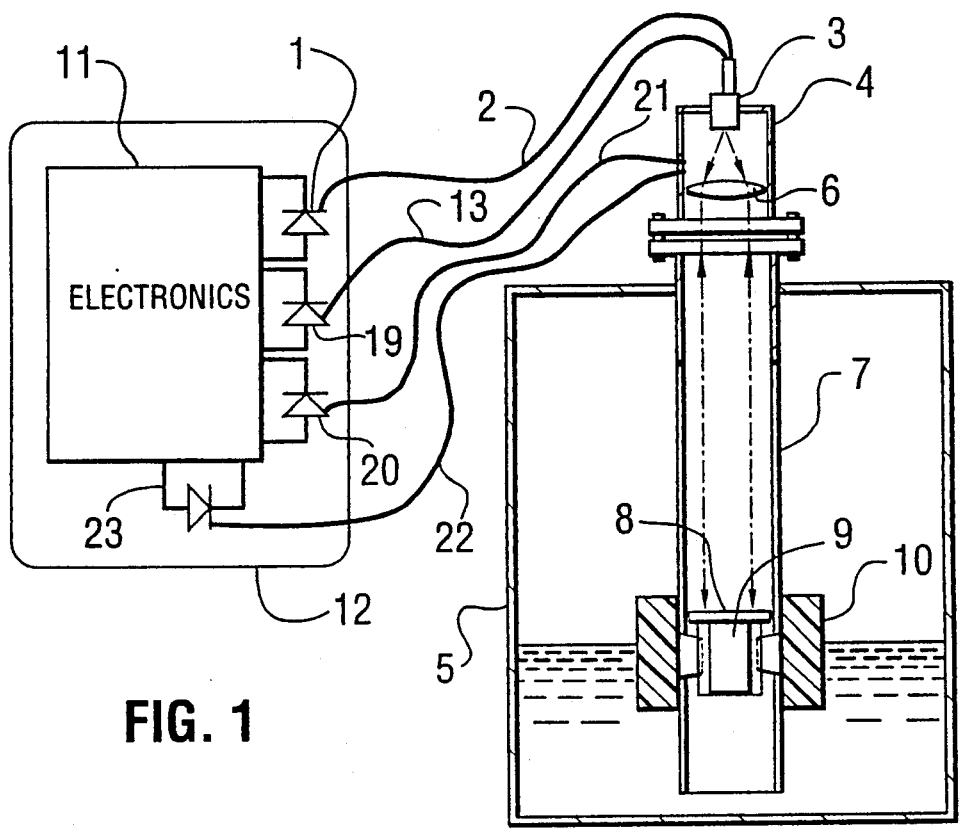
FIG. 1 is a schematic representation of the fluid level measuring system according to the present invention.

Turning to FIG. 1, a system for optical measurement of fluid level is shown according to the present invention. A remote source of light 1 provides an optical signal that is carried via an optical guide 2 to a location 3 where the measurement is effected. In a fitting 4 at either the top or bottom of the fluid container 5, light emerging from the optical guide 2 is formed by a lens 6 into a beam which propagates into the container. The beam may propagate in a tube 7, or in free space. A reflector 8 is arranged to float at a fixed distance from the liquid surface. The reflector may be the liquid itself, or a mirror, or one or a plurality of corner-cube reflectors. The preferred arrangement shown in FIG. 1 shows the reflector 8 fixed to a follower 9 which is magnetically coupled to a float 10. The float 10 is of annular shape surrounding the tube 7. The magnet 9 holds the reflector 8 at a position determined by the level of the fluid, establishing a predetermined distance between the reflector and the fitting 4 which depends on the fluid level.

Measurement of the fluid level is made by determining the distance from the fitting 4 to the reflector 8 via an optical ranging technique. This measurement is carried out at a remote location 12 by an electronic circuit 11 that generates the optical signal via remote light source I and processes the reflected signal returned from the fitting 4 via a second optical fitting 4 of container 5 only by light guides such as 2 and 13, which are characterized by very low electrical and thermal conductance. Accordingly, there are no electrical or mechanical connections from inside of the container 5 to the outside.

Figure 2:
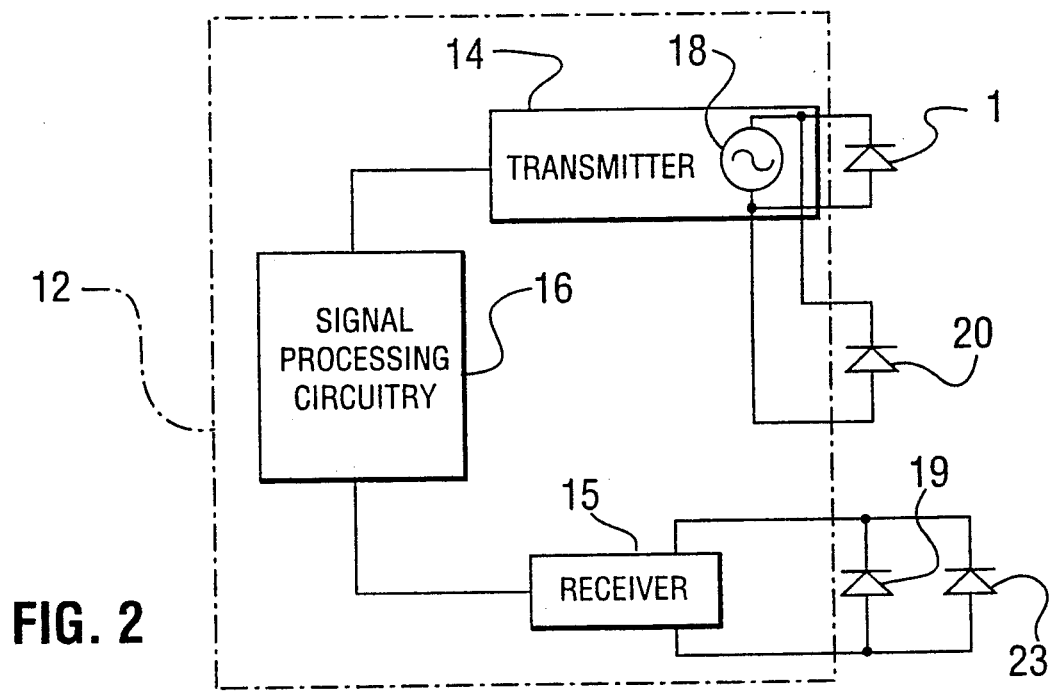
FIG. 2 is a block diagram of transmitter, receiver, and signal processing circuits according to the present invention.
Figure 3:
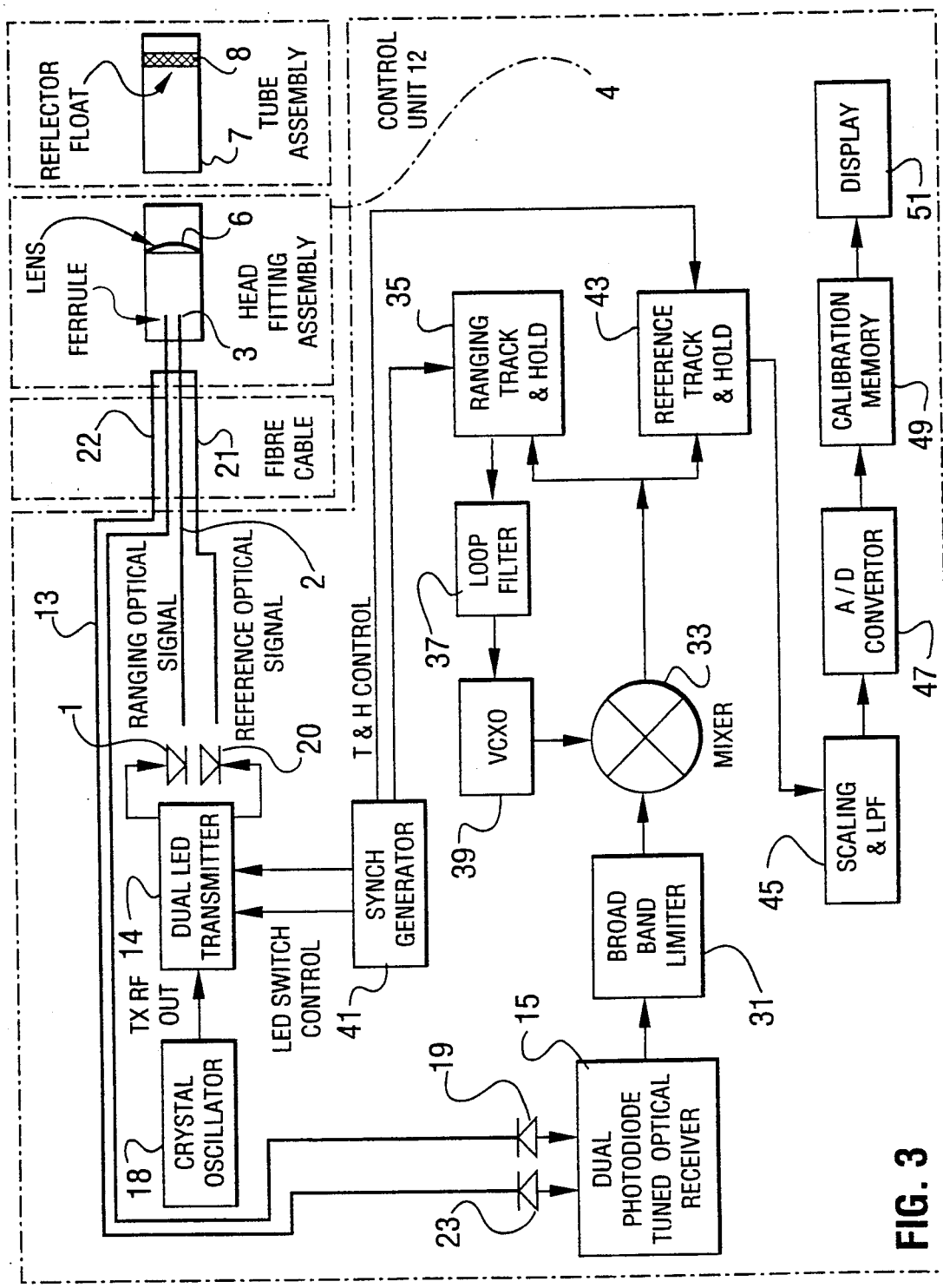
FIG. 3 is a detailed block diagram of the fluid measuring system according to the preferred embodiment.

The electronic circuit 11 is shown diagrammatically in FIG. 2. In its simplest from, the circuit comprises a transmitter 14, a receiver 15, and signal processing circuitry 16.

The transmitter is connected to optical source 1, which may typically be a laser or light emitting diode provided with means for coupling the optical signal into the optical guide 2 (FIG. 1). The transmitter 14 incorporates an oscillator 18 designed to operate at a stable frequency. This oscillator impresses a periodic modulation on the power of the emission from the optical source 1, at a frequency which corresponds to a modulation wavelength comparable to the maximum distance to be measured, as described in further detail below.

The receiver 15 comprises photoreceptors 19 and 23 such as a photodiodes for receiving the optical signals reflected by the reflector 8 and coupled to the photoreceptor 19 via lens 6 and optical guide 13 (FIG. 1), and the optical signal coupled to the photoreceptor 23 from optical guide 22. Within the receiver, the intensity of modulation of these signals is converted to an electrical signal and amplified.

Variations in the overall path length from the transmitter 14 to the photoreceptor 19 are determined via signal processing circuitry 16 by measuring the phase of the detected intensity modulation signal from receiver 15 in comparison with the phase of the signal from transmitter 14 used to modulate the optical source 1. Changes are primarily due to variations in the distance from the fitting 4 to the reflector 8. These variations are directly related to the position of the float 10, and hence the level of the fluid.

Although error in the system can be introduced due to changes in the optical path length that are not related to the distance between fitting 4 and reflector 8, these changes are very small since the path is constrained to lie within the optical guides 2 and 13, which exhibit very small sensitivity in path length to influences such as temperature changes. Error can also be introduced by means of phase changes in the circuitry of transmitter 14, receiver 15 and signal processing circuitry 16, between the points where the transmitted signal and the reflected signal are compared. To compensate for such error, a second source of light 20 may be utilized in conjunction with a third optical guide 21 for carrying a signal from the transmitter 14 in antiphase with the signal generated by optical source 1. The modulated optical signal from the second light source 20 has the same modulation frequency as that from the first source 1. In the fitting 4, the reference signal from optical source 20 is coupled into optical guide 22 without passing down the tube 7 and being reflected from the reflector 8. The signal processing circuitry 16 then compares the phase difference measured between the second reference signal and the reflected signal from reflector 8. Since both signals travel almost identical optical paths through the respective guides 2 and 21 and guides 13 and 22, and since both signals travel almost identical electronic paths, then the difference in phase between the two signals is due predominantly to the propagation delay between fitting 4 and reflector 8. The effects of temperature and other conditions on the signal delay through the optical and electronic paths are substantially nullified by this arrangement.

Although the guides 21 and 22 are referred to separately herein, according to the preferred embodiment only a single optical fiber is utilized between LED 20 and photoreceptor 23.

THEORY OF OPERATION

According to the present invention, range or distance is determined by comparing the phase of the optical signal reflected by reflector 8 with the phase of the reference signal generated by light source 1. In particular, changes in phase are directly related to changes in the difference between the lengths of the propagation paths followed by the transmitted and reflected optical signals. Specifically, such changes are caused by changes in the distance between the beam forming element 6 at the top (or bottom) of the tank 5 and the reflector 8 positioned in known relation to the surface of the liquid.

The phase difference between the transmitted and reflected signals is preferably determined by means of homodyne detection (e.g. by multiplying the two signals together). The product signal contains sum and difference frequency components, but the difference frequency component is at zero frequency (i.e. DC). The DC voltage level of the difference signal depends only on the phase difference between the transmitted and reflected optical signals, thereby providing an accurate indication of changes in the distance from the fitting 4 to the fluid level.

Homodyne multiplication can be performed directly in the receiver 15 by applying the reference signal as an electrical bias to the photodetector 19. This method eliminates the possibility of electrical path length variations between the transmitted reference signal and the reflected signal after detection. However, according to the preferred embodiment illustrated in FIG. 2, the phase detection and comparison is performed via signal processing circuitry 16.

As indicated above, the generated DC level difference signal is a voltage which depends sinusoidally on the phase difference between the transmitted and reflected optical signals. In order to avoid ambiguity, the entire range of distances to be detected must be limited so as to cause a phase change of no more than 180 degrees. Accordingly, the maximum path difference measurable is one half of the wavelength in air of the transmitted optical signal. The path length of the transmitted and reflected signals is twice the actual range of distances between the fitting head 4 and the fluid surface. Therefore, the measurement range is limited to one quarter of the wavelength of the optical signal. In practice, to ensure reasonable linearity, the measurement range should be limited to approximately one fifth of the optical signal wavelength. For example, in order to detect a range of 12 m, the wavelength must be 60 m, corresponding to a signal frequency of 5 MHz.

The resolution of the fluid level sensing system of the present invention is determined by the modulation frequency of the generated reference signal and the minimum detectable phase change, which is governed by the signal-to-noise ratio. Therefore, if 1 cm resolution is required in the example given above (i.e. a range of 12 mm to be detected), then phase changes of 0.12 degrees must be detected. Assuming that a signal-to-noise ratio of 0 dB permits a phase resolution of 180 degrees, and that the ratio of the signal to noise is proportional to the phase resolution, then the required signal to noise ratio for a 1 cm resolution in 12 m would be 64 dB.

As discussed above, the propagation delay of the reflected signal includes the propagation delay in the fixed portions of the optical path comprising optical guides 2 and 13, as well as phase and group delays in the transmitter 14 and the effects of multiplier offset. These effects are all temperature dependent. To minimize such dependence, the second light source 20 is provided for generating a signal identical with the transmitted optical signal from source 1, the second transmitted signal being applied to the further optical guide 21. As discussed above with reference to FIG. 1, the second reference signal is returned directly from the near end of the measurement range (i.e. fitting 4), via optical guide 22 and photodiode 23. For the purpose of the present invention, the first transmitted signal may be referred to as a "ranging signal" while the second transmitted signal may be referred to as a "reference signal". The reference signal and the ranging signal are transmitted alternately at a rate much slower than the modulation frequency, but at a sufficiently high rate that a steady state condition may be obtained. The circuit of the present invention is configured so that the differential delay between the reference and ranging signals output from light sources 1 and 20, respectively, is negligible.

At the receiver 15, the reference and the ranging signals follow identical electronic paths (see FIG. 4), such that the output from the multiplier when the reference signal is being transmitted, constitutes a "zero-distance" voltage reference. Provided that the optical guides 2 and 21 and 13 and 22 carrying the reference and ranging signals are of identical length, any phase changes therebetween are compensated by the arrangement discussed above. Furthermore, variations in downlead length during installation are ignored by the circuit.

DESCRIPTION OF BEST MODE

Turning to FIGS. 3-8, a complete block diagram and detailed circuit schematics are provided to illustrate the best mode of implementing the invention at the time of filing the present application.

Overall Operation

The overall operation of the circuit is as follows: (refer to the block diagram FIG. 3) The crystal oscillator generates an accurate 24 MHZ electrical signal, which drives the dual LED transmitter. The transmitter converts the electrical 24 MHZ signal to an optical signal modulated at 24 MHZ, and alternately transmits from the range LED 1 and the reference LED 20 into the range and reference fibers respectively. The range optical signal travels through the transmit range fiber to the head fitting assembly where it is focused down the tube by the lens 6. The reflector 8 is located at a specified distance from the fluid level and reflects the range signal back up the tube. The returning range signal is focused by lens 6 into the receive range fiber where it travels to the receiver.

The reference optical signal travels through the transmit reference fiber to the head fitting assembly, and then returns directly to the receiver via the receive reference fiber. The received range and reference signals are converted from optical signals to electrical signals and are amplified to usable levels by the receiver. The broadband limiter outputs a constant amplitude signal despite optical level variations at the receiver, which can be due to reflector position, stress on the fibers, contaminants in the tube assembly or fiber connectors, bending of the tube assembly, or temperature variations.

The limiter output drives the mixer, which is part of a phase locked loop consisting of the mixer, ranging track and hold, loop filter, and voltage controlled crystal oscillator (VCXO). During the range interval (the time during which the transmitter is transmitting from the range LED 1) the phase locked loop locks the frequency and phase of the VCXO to the frequency and phase of the range signal at the limiter output. During the reference interval (the time during which the transmitter is transmitting from the reference LED 20) this frequency and phase of the VCXO is maintained by the electrical inertia of the loop filter. During the reference interval the phase of the reference signal is compared with the phase of the VCXO output by the mixer. This is equivalent to comparing the phase of the reference signal with the phase of the range signal. The phase of the range and reference cannot be compared directly since the signals do not exist at the same time.

The synch generator instructs the transmitter when to operate each of the two LEDs and coordinates the two track and hold circuits to properly direct the range and reference signals. The ranging track and hold only allows the mixer output to pass to the loop filter during the range interval, which ensures that the phase locked loop only locks onto the range signal. The reference track and hold only allows the mixer output to pass during the reference interval, and maintains its output at the reference interval value during the range interval. The reference track and hold output is thus the mixer output voltage which corresponds to the phase difference between the range and reference signals. This phase difference is due solely to the additional travel time taken by the range signal to travel up and down the tube, which is directly proportional to the distance between the head fitting assembly and the reflector. Consequently, the voltage at the reference track and hold output is directly proportional to the distance from the head to the fluid level.

Since the range and reference signals originate from the same crystal oscillator and transmitter, travel through matched fiber lengths, take the same path through the receiver and limiter, and drive the same mixer, the only opportunity for drift due to temperature changes or aging is mismatch between the transmitter LEDs 1 and 20 and the receiver photodiodes 19 and 23. This mismatch can be controlled by selecting devices which have large bandwidths, operating them under identical conditions, and carefully selecting their electrical operating points.

The distance voltage is scaled and noise filtered by the scaling and low pass filter circuit. The A/D convertor changes the analog distance voltage to a digital quantity, which drives the calibration memory. This memory is programmed to determine the volume of the fluid in the tank as a function of the distance between the head and the top of the fluid. This volume is then displayed.

Figure 4:
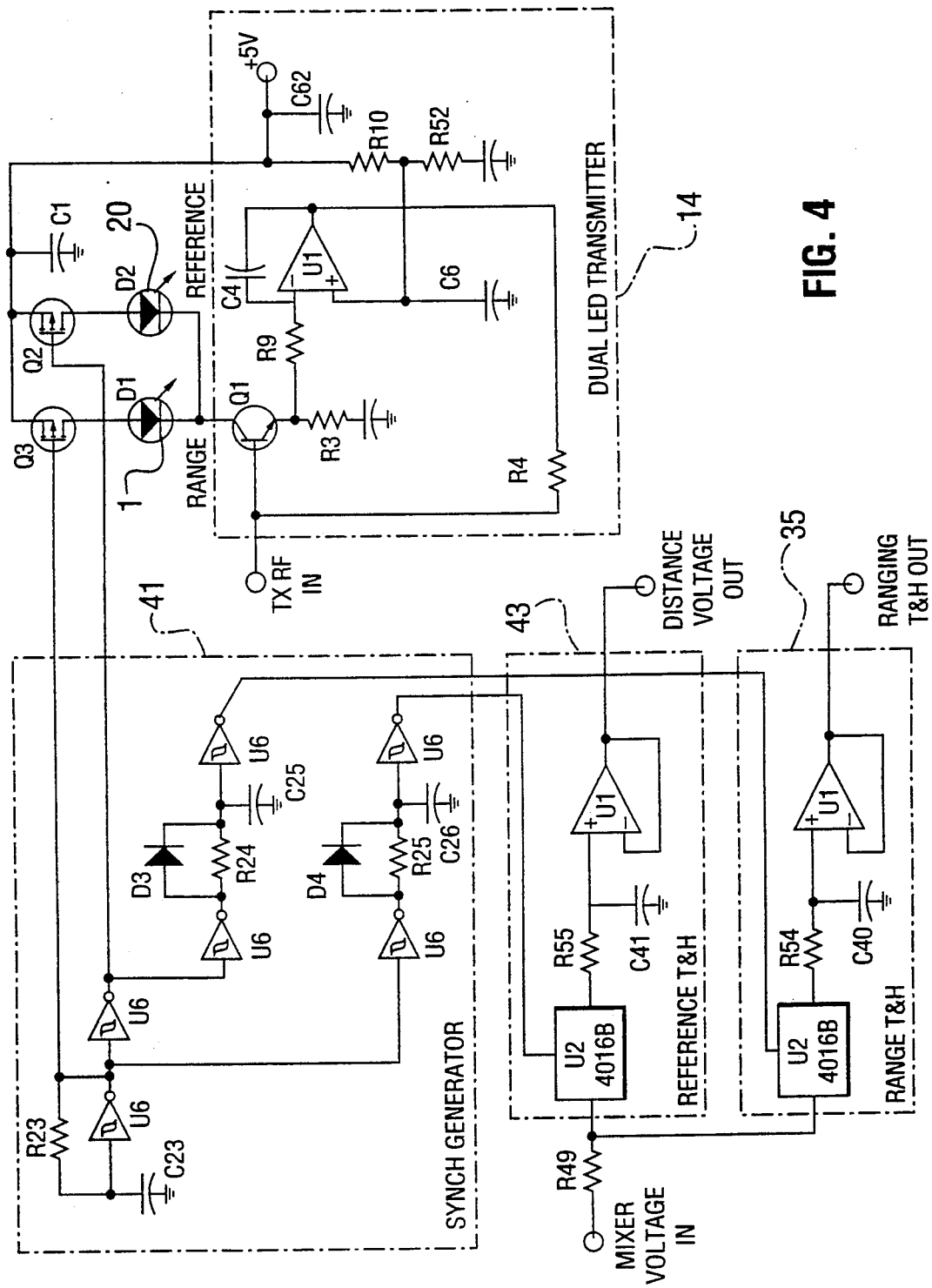
FIG. 4 is a schematic diagram of the transmitter, synch generator, and track and hold circuitry according to the preferred embodiment.
Figure 9:
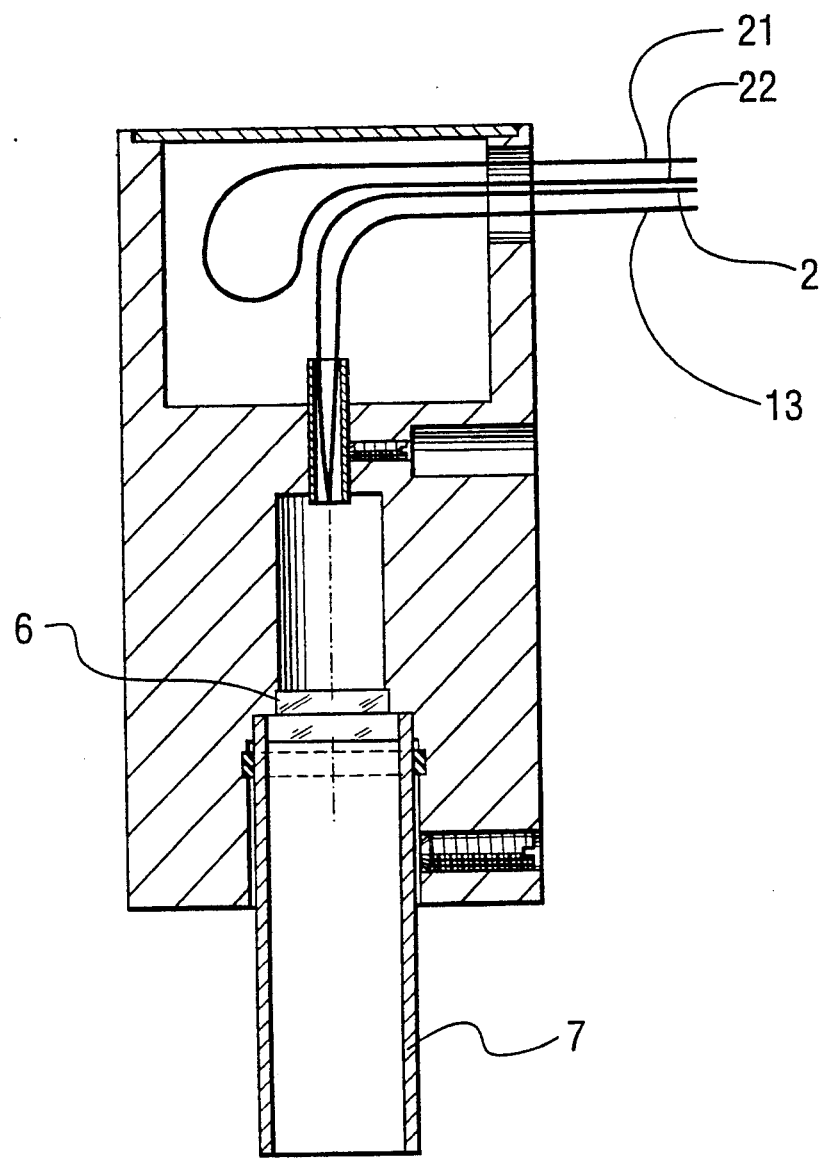
FIG. 9 is a detailed mechanical drawing of a tank fitting according to the preferred embodiment.

FIGS. 5-8 show schematic circuit details of the blocks in FIG. 4. An engineering diagram of fitting 4 is enclosed in FIG. 9 showing the best mode contemplated for the fitting.

Detailed Circuit Operation

Figure 7:
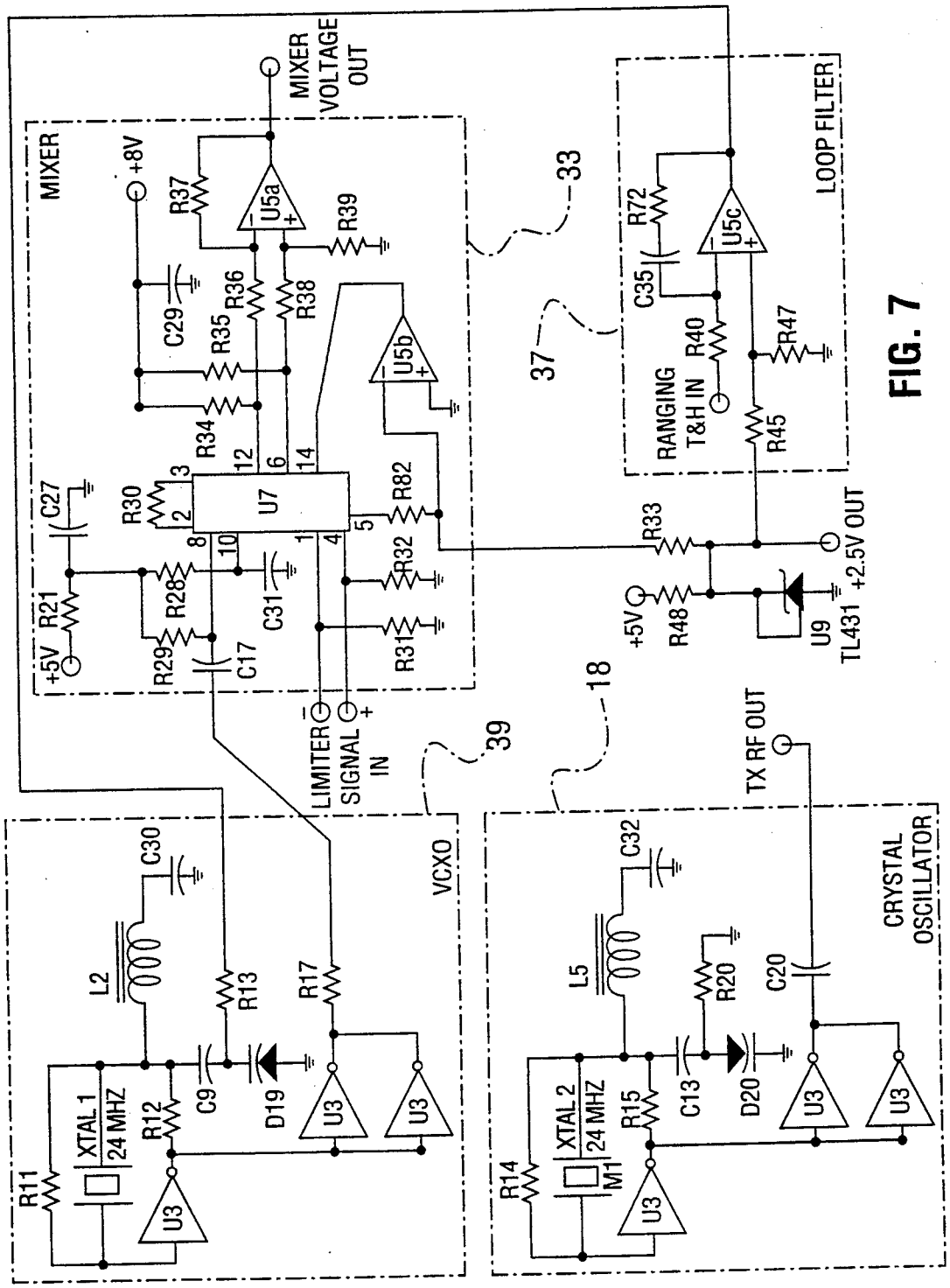
FIG. 7 is a schematic diagram of the crystal oscillator, VCXO, mixer, and loop filter circuitry according to the preferred embodiment.
Figure 8:
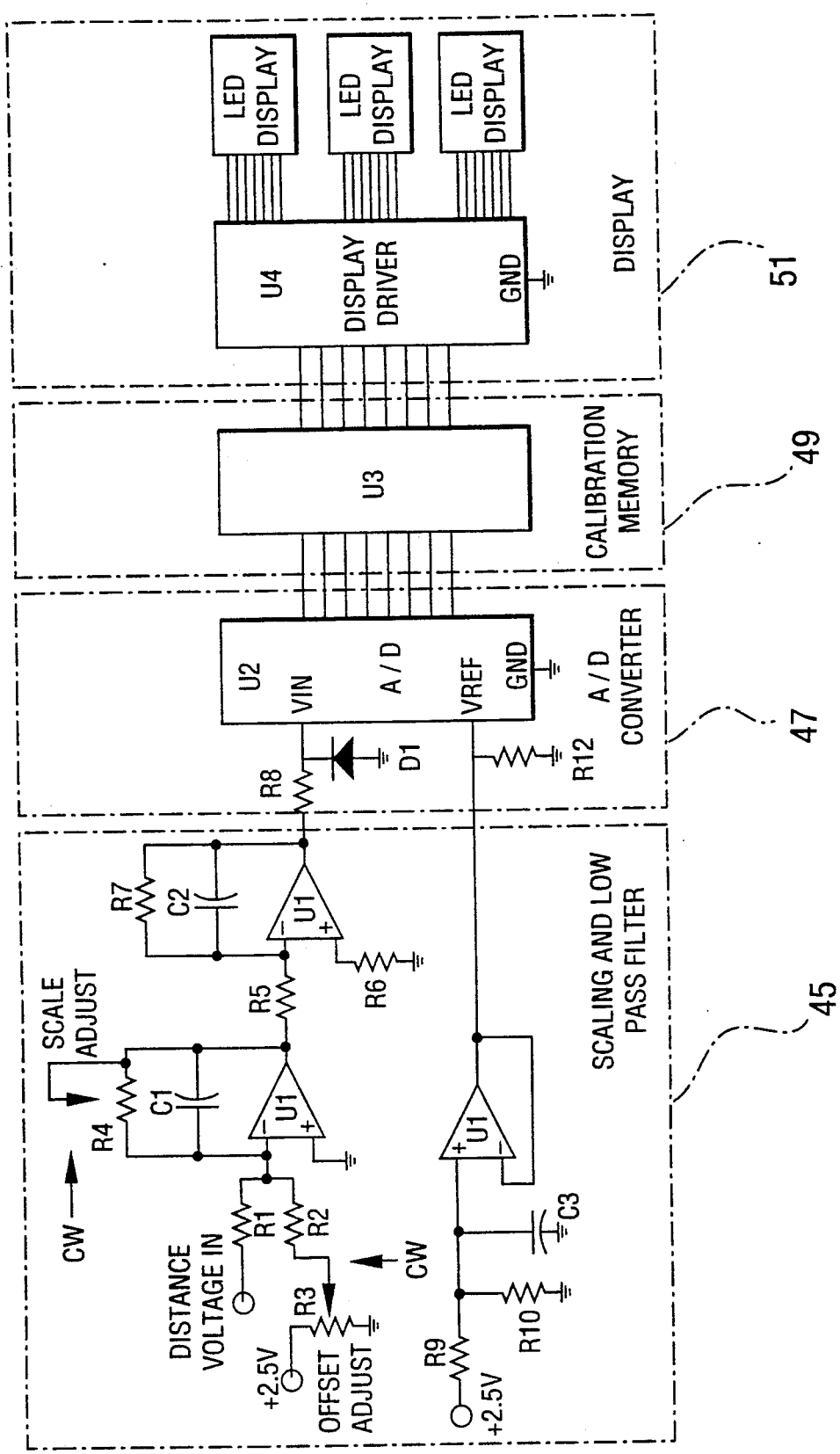
FIG. 8 is a schematic diagram of the scaling and low pass filter, A/D convertor, calibration memory, and display circuitry according to the preferred embodiment.

Referring to FIG. 7, the crystal XTAL2 determines the operating frequency of the oscillator U3 and associated circuitry. Since XTAL2 is a third overtone crystal, the tuned network L5 and C13/D20 is required to force operation at 24 MHZ rather than 8 MHz. The use of the tuning diode D20 helps temperature tracking with the VCXO. The square wave output TX RF OUT drives the transmitter, shown in FIG. 4. Q1 amplifies the signal to provide sufficient drive current for the LEDs. A negative feedback loop consisting of U1 and associated circuitry is used to maintain a constant average current flow through the LEDs. FET transistors Q2 and Q3 are controlled by the synch generator and are used to alternately switch between the range and reference LEDs.

The synch generator in FIG. 4 consists of a free running multivibrator R23, C23, and U6 which drives the FETs Q2 and Q3 as well as the pulse width modifiers R24, C25, D3, & U6 and R25, C26, D4, & U6. The pulse width modifiers narrow the positive pulses from the multivibrator to drive the track and hold circuits. The narrowed pulses allow LED switching transients to subside before the track and holds permit the mixer signal to pass.

Figure 5:
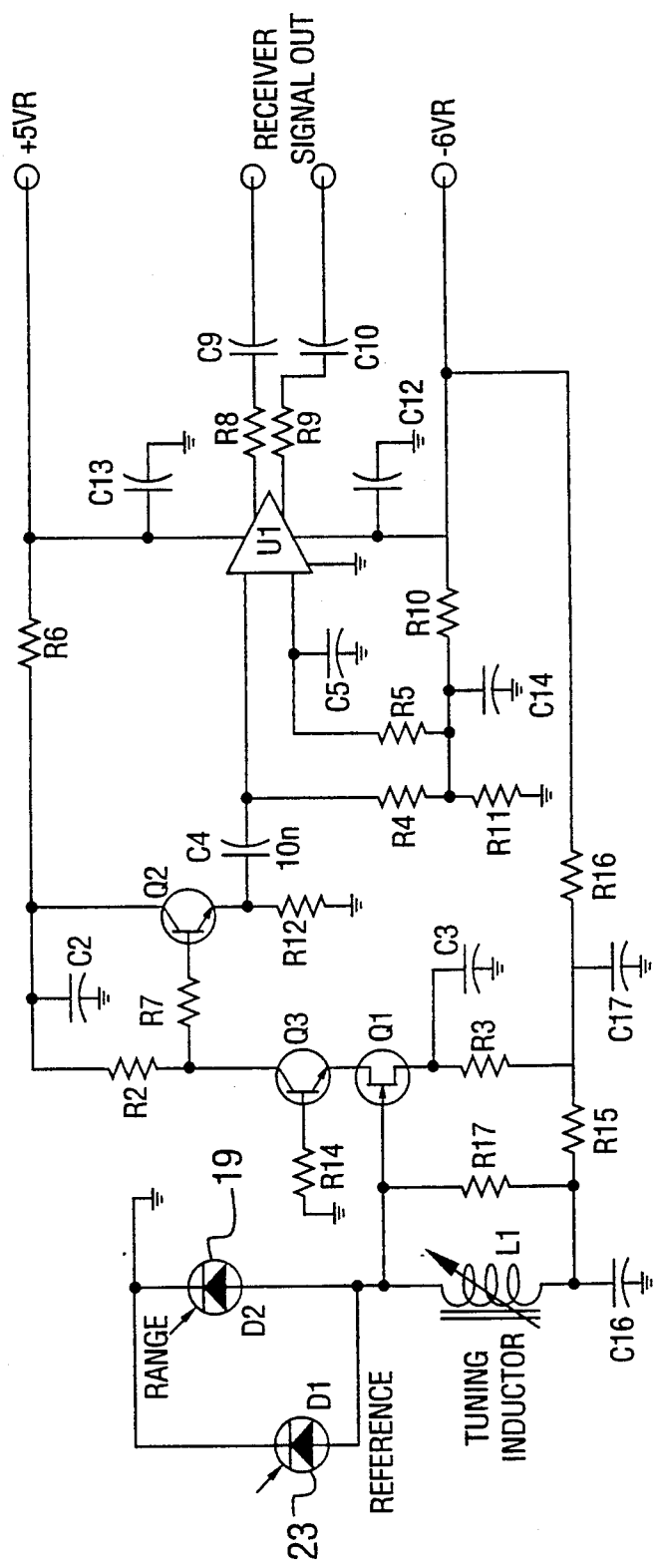
FIG. 5 is a schematic diagram of the receiver circuitry according to the preferred embodiment.

FIG. 5 shows the receiver. The two receiver photodiodes D1 and D2 are connected in parallel so that either one can drive the receiver amplifier. Tuning inductor L1 cancels the effect of the capacitance of the photodiodes and FET Q1, which gives greater receiver sensitivity. Q1, Q2 and Q3 form a buffered cascode preamplifier for high voltage gain at 24 MHz. The output of this preamplifier drives the integrated circuit video amplifier U1, which is set for a gain of 400 times (52 dB). The overall receiver gain is chosen to give the maximum signal level without overload.

Figure 6:
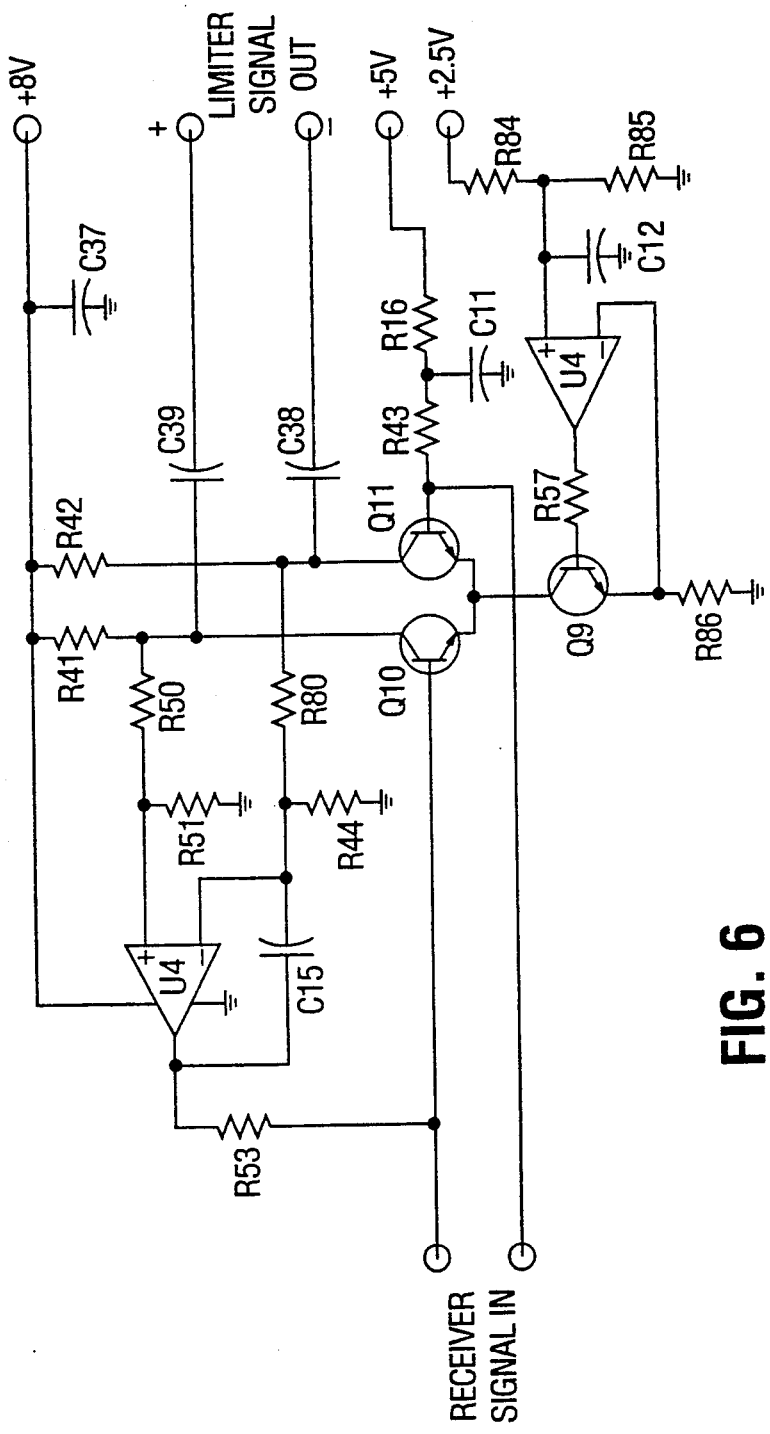
FIG. 6 is a schematic diagram of the limiter circuitry according to the preferred embodiment.

FIG. 6 shows the limiter, which consists of Q10 and Q11 configured as an overdriven differential amplifier. When one transistor is on, the other is off, so that the output voltage amplitude from the circuit is constant, regardless of input signal level above a certain point. Q9 and the lower U4 form a constant current source; the magnitude of this current multiplied by the collector resistors R41 and R42 gives the output signal amplitude. The upper U4 balances the two transistors, which minimizes spurious signal phase shift with input amplitude variations.

Returning to FIG. 7, U7 is the mixer which compares the phase of the VCXO with the phase of the received signal from the limiter. Its output is differential, and is converted to a single ended signal by U5 to give the MIXER VOLTAGE OUT. The regulator U9 and the op amp U5 (the middle one) maintain constant current through the mixer for high measurement accuracy. The MIXER VOLTAGE OUT alternates between a constant determined by the phase locked loop during the ranging interval, and a variable voltage corresponding to float position during the reference interval. FIG. 4 shows the track and hold circuits, the 4016 U2 is a FET switch which allows signal transmission when on and is an open circuit when off. Capacitors C41 and C40 hold the signal voltage during the time that U2 is off and U1 buffers this voltage t prevent droop. The RANGE VOLTAGE OUT is the constant voltage and is conditioned by the loop filter in FIG. 7 (the lower U5) to drive the VCXO U3. The VCXO has the same structure as the crystal oscillator except that the tuning diode D19 allows sufficient frequency variation to allow the matching of frequency and phase between the two oscillators.

The reference track and hold maintains the variable voltage corresponding to float position during the range interval to give a constant DISTANCE VOLTAGE OUT. This voltage is scaled in FIG. 8 by U1, R3, R4, and associated components to condition the distance voltage to fit within the input range of the Analog to Digital (A/D) convertor U2. The output of the A/D convertor addresses the memory U3. In each of the addressed memory locations is stored the volume of fluid corresponding to the distance given by that address. This digital volume data then operates a numerical display consisting of U4 and the LED displays. In addition to the display, this volume data can be used to operate other equipment such as pumps and valves for process control.

Other embodiments and variations of the invention are possible within the sphere and scope of claims appended hereto.

We claim:

1. A system for measuring fluid level of a liquid surface in a container within a predetermined range of levels comprising:
   a) a transmitter for alternately generating a first optical signal and a second optical signal;
   b) a fitting connected to said container;
   c) a first optical guide connected to said transmitter and said fitting for receiving said first optical signal and transmitting said first optical signal to said fitting;
   d) a second optical guide connected to said transmitter and said fitting for receiving said second optical signal and transmitting said second optical signal to said fitting;

e) means within said fitting for directing said first optical signal toward said liquid surface, said means for directing being disposed at a distance from said liquid surface to be detected;

f) a tube arranged vertically within said container and connected to said fitting for confining said first optical signal and said reflected ranging signal therewithin;

g) a reflector disposed in said container at a distance from said means for directing which is linearly related to said distance from said liquid surface to be determined, for reflecting said first optical signal so as to form a reflected ranging signal, wherein said reflector comprises an annular float surrounding said tube, a magnetic follower within said tube and magnetically coupled to said float for maintaining a predetermined orientation of said float relative to said tube, and wherein said reflector is mounted to said float;

h) a receiver associated with said transmitter;

i) a third optical guide connected to said fitting and said receiver;

j) means within said fitting for directing said reflected ranging signal into said third optical guide;

k) a fourth optical guide connected to said fitting and said receiver;

l) means within said fitting for directing said second optical signal into said fourth optical guide; and m) signal processing means connected to said receiver for comparing said second optical signal and said reflected ranging signal and in response generating a signal representing phase shift therebetween, wherein said phase shift is directly proportional to said distance from said liquid surface to be detected.

2. A system for measuring fluid level of a liquid surface in a container within a predetermined range of levels comprising:

a) a transmitter for alternately generating a first optical signal and a second optical signal;

b) a fitting connected to said container;

c) a first optical guide connected to said transmitter and said fitting for receiving said first optical signal and transmitting said first optical signal to said fitting;

d) a second optical guide connected to said transmitter and said fitting for receiving said second optical signal and transmitting said second optical signal to said fitting;

e) means within said fitting for directing said fist optical signal toward said liquid surface, said means for directing being disposed at a distance from said liquid surface to be detected;

f) a reflector disposed in said container at a distance from said means for directing which is linearly related to said distance from said liquid surface to be determined, for reflecting said first optical signal so as to form a reflected ranging signal;

g) a receiver associated with said transmitter;

h) a third optical guide connected to said fitting and said receiver;

i) means within said fitting for directing said reflected ranging signal into said third optical guide;

j) a fourth optical guide connected to said fitting and said receiver;

k) means within said fitting for directing said second optical signal into said fourth optical guide; and l) signal processing means connected to said receiver for comparing said second optical signal and said reflected ranging signal and in response generating a signal representing phase shift therebetween, wherein said phase shift is directly proportional to said distance from said liquid surface to be detected, and wherein said signal processing means comprises a homodyne circuit for multiplying said second optical signal and said reflected ranging signal and in response generating sum and difference signals, said difference signal being a DC voltage signal which is proportional to the phase difference between said second optical signal and said reflected ranging signal, and means for converting said DC voltage signal to a digital output signal indicative of said distance from said liquid surface to be detected.

3. A system for measuring fluid level of a liquid surface in a container within a predetermined range of levels comprising:

a) a transmitter for alternately generating a first optical signal and a second optical signal;

b) a fitting connected to said container;

c) a first optical guide connected to said transmitter and said fitting for receiving said first optical signal and transmitting said first optical signal to said fitting;

d) a second optical guide connected to said transmitter and said fitting for receiving said second optical signal and transmitting said second optical signal to said fitting;

e) means within said fitting for directing said first optical signal toward said surface, said means for directing being disposed at a distance from said liquid surface to be detected;

f) a reflector disposed in said container at a distance from said means for directing which is linearly related to said distance from said liquid surface to be determined, for reflecting said first optical signal so as to form a reflected ranging signal;

g) a receiver associated with said transmitter;

h) a third optical guide connected to said fitting and said receiver;

i) means within said fitting for directing said reflected ranging signal into said third optical guide;

j) a fourth optical guide connected to said fitting and said receiver;

k) means within said fitting for directing said second optical signal into said fourth optical guide; and l) signal processing means connected to said receiver for comparing said second optical signal and said reflected ranging signal and in response to generating a signal representing phase shift therebetween, wherein said phase shift is directly proportional to said distance from said liquid surface to be detected, and wherein said signal processing means comprises a heterodyne circuit for multiplying said second optical signal and said reflected ranging signal and in response generating sum and difference signals, said difference signal being an intermediate frequency signal the phase of which is proportional to the phase difference between said second optical signal and said reflected ranging signal, and means for converting said intermediate frequency signal to a digital output signal indicative of said distance from said liquid surface to be detected.

* * * * *